US009379907B2

(12) United States Patent
Kagan et al.

(10) Patent No.: US 9,379,907 B2
(45) Date of Patent: Jun. 28, 2016

(54) MULTICHANNEL INTELLIGENT ELECTRONIC DEVICE WITH ADVANCED COMMUNICATION CAPABILITIES (75) Inventors: Andrew Kagan, Great Neck, NY (US); Erran Kagan, Great Neck, NY (US)

(73) Assignee: Electro Industries/Gauge Tech, Westbury, NY (US)

(*) Notice: Subject to any disclaimer, the term of this patent is extended or adjusted under 35 U.S.C. 154(b) by 753 days.

(21) Appl. No.: 12/051,343

(22) Filed: Mar. 19, 2008

(65) Prior Publication Data
US 2008/0158008 A1 Jul. 3, 2008

(51) Int. Cl.
G08C 19/06 (2006.01)
H04L 12/46 (2006.01)
G01D 4/00 (2006.01)

(52) U.S. Cl.
CPC ............ *H04L 12/4633* (2013.01); *G01D 4/004* (2013.01); *Y02B 90/242* (2013.01); *Y04S 20/322* (2013.01)

(58) Field of Classification Search
CPC . H04L 12/4633; Y02B 90/242; Y04S 20/322; G01D 4/004
USPC ......... 340/870.02, 870.01, 637; 324/142, 137
See application file for complete search history.

(56) References Cited

U.S. PATENT DOCUMENTS

| | | | | |
|---|---|---|---|---|
| 5,224,011 A | * | 6/1993 | Yalla et al. | 361/93.2 |
| 5,369,691 A | * | 11/1994 | Cain et al. | 379/106.03 |
| 5,545,981 A | * | 8/1996 | Dubin et al. | 324/142 |
| 5,559,870 A | * | 9/1996 | Patton et al. | 379/106.03 |
| 5,572,438 A | * | 11/1996 | Ehlers et al. | 700/295 |
| 5,974,312 A | * | 10/1999 | Hayes et al. | 455/419 |
| 6,208,266 B1 | * | 3/2001 | Lyons et al. | 340/870.02 |
| 6,311,105 B1 | | 10/2001 | Budike, Jr. | |
| 6,333,975 B1 | * | 12/2001 | Brunn et al. | 379/106.03 |
| 6,529,883 B1 | * | 3/2003 | Yee et al. | 705/63 |
| 6,728,646 B2 | * | 4/2004 | Howell et al. | 702/62 |
| 6,735,535 B1 | * | 5/2004 | Kagan et al. | 702/61 |
| 6,785,711 B1 | * | 8/2004 | Motoyama et al. | 709/206 |
| 6,847,300 B2 | * | 1/2005 | Yee et al. | 340/584 |
| 6,900,738 B2 | * | 5/2005 | Crichlow | 340/870.02 |
| 6,937,003 B2 | * | 8/2005 | Bowman et al. | 324/117 R |
| 7,053,790 B2 | * | 5/2006 | Jang et al. | 340/870.02 |
| 7,379,791 B2 | * | 5/2008 | Tamarkin et al. | 700/286 |
| 7,589,516 B2 | * | 9/2009 | Rzehak et al. | 324/107 |
| 2007/0150237 A1 | | 6/2007 | Swarztrauber et al. | |
| 2010/0156664 A1 | | 6/2010 | Swarztrauber et al. | |
| 2012/0022814 A1 | | 1/2012 | Swarztrauber et al. | |

FOREIGN PATENT DOCUMENTS

EP 0 176 634 * 8/1984 ............ G01R 21/00

* cited by examiner

*Primary Examiner* — Zeev V Kitov
(74) *Attorney, Agent, or Firm* — Gerald E. Hespos; Michael J. Porco; Matthew T. Hespos (57) ABSTRACT

An intelligent electronic device (IED) for monitoring/measuring parameters of electrical services to a plurality of loads and receiving/transmitting information over communication networks is disclosed. The electrical services may be connected to the same or different AC services. The IED may be configured as a terminal or a server of an Intranet, LAN, WAN, or the Internet. In one application, these techniques are implemented in IEDs such as digital electrical power and energy meters.

76 Claims, 9 Drawing Sheets

MULTICHANNEL INTELLIGENT ELECTRONIC DEVICE WITH ADVANCED COMMUNICATION CAPABILITIES

FIELD

The present disclosure relates generally to the field of intelligent electronic devices for electrical utility services and, more specifically, to digital electrical power and energy meters for the electrical utility services.

BACKGROUND

Electrical utilities gradually replace traditional means for managing and controlling the distribution and consumption of electrical power to industrial and residential customers with intelligent electronic devices ("IEDs"), such as digital electric power and energy meters, electronically-controlled Remote Terminal Units ("RTUs"), and the like.

In operation, conventional IEDs provide a broad selection of monitoring individual electrical services or individual loads. However, despite a significant effort in the art, there is still a need for IEDs capable of simultaneous monitoring parameters of different electrical services or pluralities of loads, as well as being provided with a means of data connectivity to communication networks. Therefore, further improvements in IEDs would be desirable.

SUMMARY

One aspect of the present disclosure provides an intelligent electronic device (IED), such as a digital electrical power and energy meter, capable of monitoring parameters of electrical services to a plurality of loads and receiving/transmitting information over communication networks. The monitored electrical services may be connected to power supply lines of the same or different 3-phase AC services. The IED may be configured as a terminal or a server of a network, such an Intranet, LAN, WAN, or the Internet. These techniques may be implemented in other IEDs, including Programmable Logic Controllers (PLCs), Remote Terminal Units, protective relays, and/or fault recorders.

According to one aspect of the present disclosure, an intelligent electronic device for measuring or calculating parameters of a plurality of electrical services is provided including at least one metering module coupled to each of the plurality of electrical services and metering module configured for measuring or calculating parameters of the electrical services, wherein said electrical service include at least one of a single phase, dual phase or three phase system; a processing module coupled to each of the at least one metering module and configured for administering operation of the device and processing data obtained from each at least one metering module; a user interface unit adapted for displaying data and configuring settings of the device; and a communication module configured for transmitting outgoing data to and receiving incoming data from terminals of a communication network.

According to another aspect of the present disclosure, a digital electrical power and energy meter is provided. The meter includes a processing module configured for administering operation of the meter; and a communication module configured for transmitting outgoing information to and receiving incoming information from terminals of a communication network, wherein the meter includes a memory containing codes of programs providing operability of the meter; and a processor executing these codes to perform (i) measuring or calculating parameters of a plurality of electrical services connected to power supply lines of one AC service or to power supply lines of a plurality of independent AC services, and (ii) configuring the meter to operate as a server or a terminal of the communication network. The measured or calculated parameters may include a line voltage, a line current, a phase voltage, a phase current, and a total harmonic distortion (THD) or a root mean square (RMS) value thereof; energy, revenue, real power, reactive power, total power, and a power factor.

In a further aspect, the metering module comprises a plurality of multi-channel processors each simultaneously measuring in real time parameters of up to 6 voltage and current waveforms.

In another aspect, the metering module comprises one of (i) a multiplexer for multiplexing signals corresponding to waveforms at voltage inputs and current inputs of said device, and (ii) multiplexers for selective multiplexing the signals corresponding to waveforms at the voltage inputs or at the current inputs. The multiplexed voltage and current inputs are configurable via the user interface unit.

Various aspects and embodiments of the disclosure are described in further detail below.

The Summary is neither intended nor should it be construed as being representative of the full extent and scope of the present disclosure, which these and additional aspects will become more readily apparent from the detailed description, particularly when taken together with the appended drawings.

To facilitate understanding, identical reference numerals have been used, where possible, to designate identical elements that are common to the figures, except that alphanumerical suffixes may be added, when appropriate, to differentiate such elements. The images in the drawings are simplified for illustrative purposes and are not depicted to scale.

The appended drawings illustrate exemplary embodiments of the present disclosure and, as such, should not be considered as limiting the scope of the disclosure that may admit to other equally effective embodiments. Correspondingly, it has been contemplated that features or steps of one embodiment may beneficially be incorporated in other embodiments without further recitation.

In some embodiments, particular method steps of the discussed methods are performed in the depicted order. In alternate embodiments, in the respective methods, at least two method steps or portions thereof may be performed contemporaneously, in parallel, or in a different order.

DETAILED DESCRIPTION

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, i is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, a digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Aspects of the present disclosure are illustratively described herein within the context of intelligent electronic devices ("IEDs") such as digital electrical power and energy meters, including revenue accuracy certifiable meters. The term "digital electrical power and energy meters" is broadly used herein in reference to IEDs adapted to record, measure, and communicate at least some of supply currents and supply voltages of the respective electrical service, their waveforms, harmonics, transients, and other disturbances, and the corresponding parameters, such as power, power quality, energy, revenue, and the like.

It will be appreciated by those skilled in the art that the disclosure may also be utilized within the context of other IEDs, including Programmable Logic Controllers ("PLC's"), Remote Terminal Units ("RTUs"), protective relays, and fault recorders, among other devices or systems used to manage and control quality, distribution, and consumption of electrical power.

The word "exemplary" is used herein to mean "serving as an example, instance, or illustration." Any configuration or design described herein as "exemplary" is not necessarily to be construed as preferred or advantageous over other configurations or designs. Herein, the phrase "coupled with" is defined to mean directly connected to or indirectly connected with through one or more intermediate components. Such intermediate components may include both hardware and software based components.

Figure 1A:
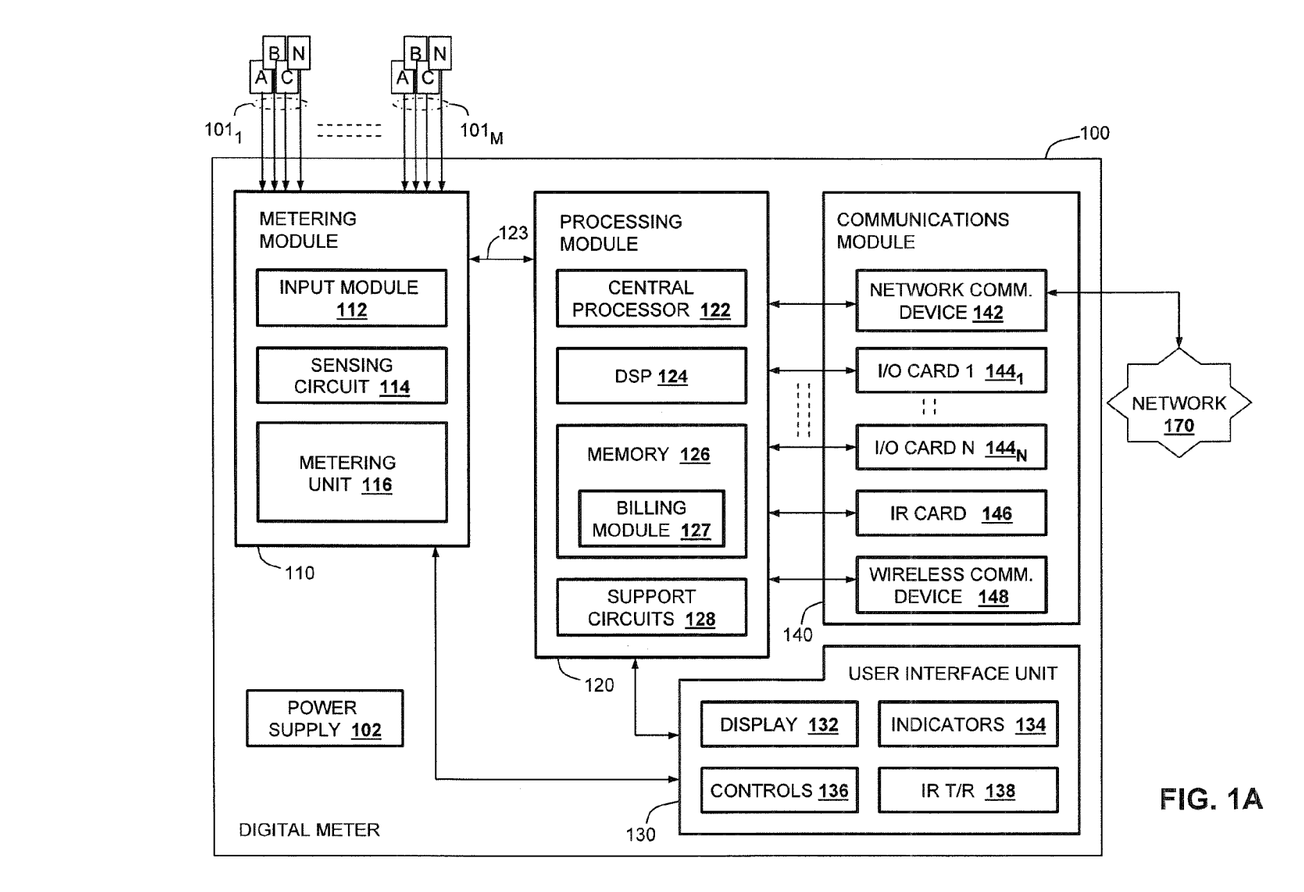
FIGS. 1A-1C depict a schematic diagram of an exemplary intelligent electronic device, e.g., a digital electrical power and energy meter (FIG. 1A) and exemplary schematic views of front (FIG. 1B) and rear (FIG. 1C) panels of the meter in accordance with one embodiment of the present disclosure.

FIG. 1A depicts a schematic diagram illustrating an exemplary multi-input digital electrical power and energy meter 100 (referred to hereafter as "meter"). The meter 100 generally comprises a metering module 110, a processing module 120, an optional user interface unit 130, a communications module 140, and a power supply 102 and may be connected to a network 170. The meter 100 may be connected to the network 170 using existing or dedicated telephone/cable interfaces compatible with packetized data transmissions.

The metering module 110 includes an input module 112, sensing circuits 114, and a measuring unit 116. Via the input module 112, the metering module 110 is coupled to power lines of electrical services $101_i$ (discussed in detail in reference to FIGS. 2A-2B below), where $1=i=M$ and M is an integer. In the depicted embodiment, the power lines illustratively include phase lines A, B, and C and a neutral line N. Some methods of coupling digital electrical power and energy meters to electrical services are described in detail in commonly assigned U.S. Pat. No. 7,271,996, the contents of which are incorporated by reference. Additionally or alternatively, each of the electrical services 101 may include pluralities of sub-sets of phase lines and/or subsets including phase and neutral lines.

Figure 2A:
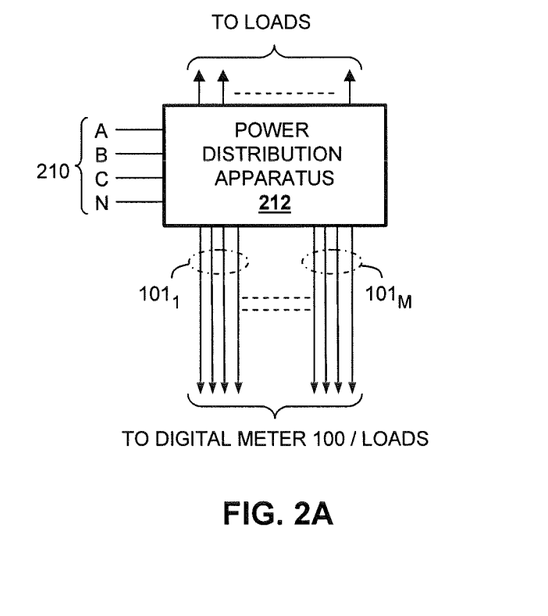
FIGS. 2A-2B are schematic diagrams illustrating wiring configurations of exemplary electrical services monitored by the meter of FIG. 1.

Referring to FIG. 2A, each of the electrical services $101_i$ is originated by a single supply service 210 at points of connection to particular loads thereof. In the depicted exemplary embodiment, such points of connection are formed within a power distribution apparatus (or panel) 212, and the electrical services 101 include phase lines A, B, and C and a neutral line N.

In one exemplary embodiment, a number of the loads monitored by the meter 100 is eight (i.e., M=8). In this embodiment, the meter 100 is connected to 8 sub-sets 101 of outgoing power lines of the power distribution apparatus 212. In operation, the meter 100 measures and calculates parameters corresponding to or derived from n=3 phase/line voltages and up to m=3×8=24 currents of these eight loads.

In particular, for each of the monitored loads, the meter 100 may measure, calculate, and analyze a line voltage, a line current, a phase voltage, a phase current, and a total harmonic distortion (THD) or a root mean square (RMS) value thereof; energy, revenue, real power, reactive power, total power, and a power factor, among other parameters of a particular electrical service 101.

Figure 2B:
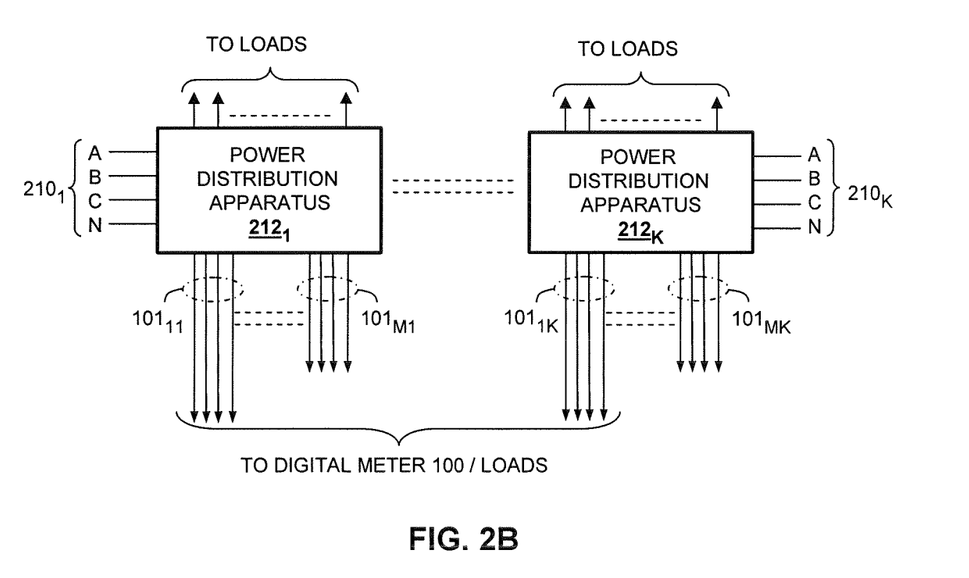

Referring to FIG. 2B, the meter 100 is coupled to a plurality of K independent supply services 210, which are selectively wired for powering pluralities of loads (not shown) selectively connected to such services. All or a portion of particular sub-sets of power lines may be connected to the meter 100

(illustratively, sub-sets $101_{1j}$ of the power lines the power distribution apparatuses 212 are connected to the meter 100, wherein 1=j=K).

In operation, the meter measures and/or calculates parameters corresponding to or derived from the respective sub-sets 101 of a plurality of the supply services 210. When, for example, the meter 100 is inputted with Q sub-sets of P independent supply services 210 to L=QP loads, the meter measures and/or calculates parameters corresponding to P sub-sets, each such subset including n=3 phase/line voltages and m=3QP currents of these loads.

In specific embodiments, electrical services 101 may have custom wiring configurations, for example, single-phase, dual-phase, Wye, Delta, or multi-phase wiring configurations. In yet other embodiments, at least a portion of the power lines connected to the meter 100 may be represented by voltage/current wiring pairs, which form input voltage/current interfaces of the meter.

Figure 3A:
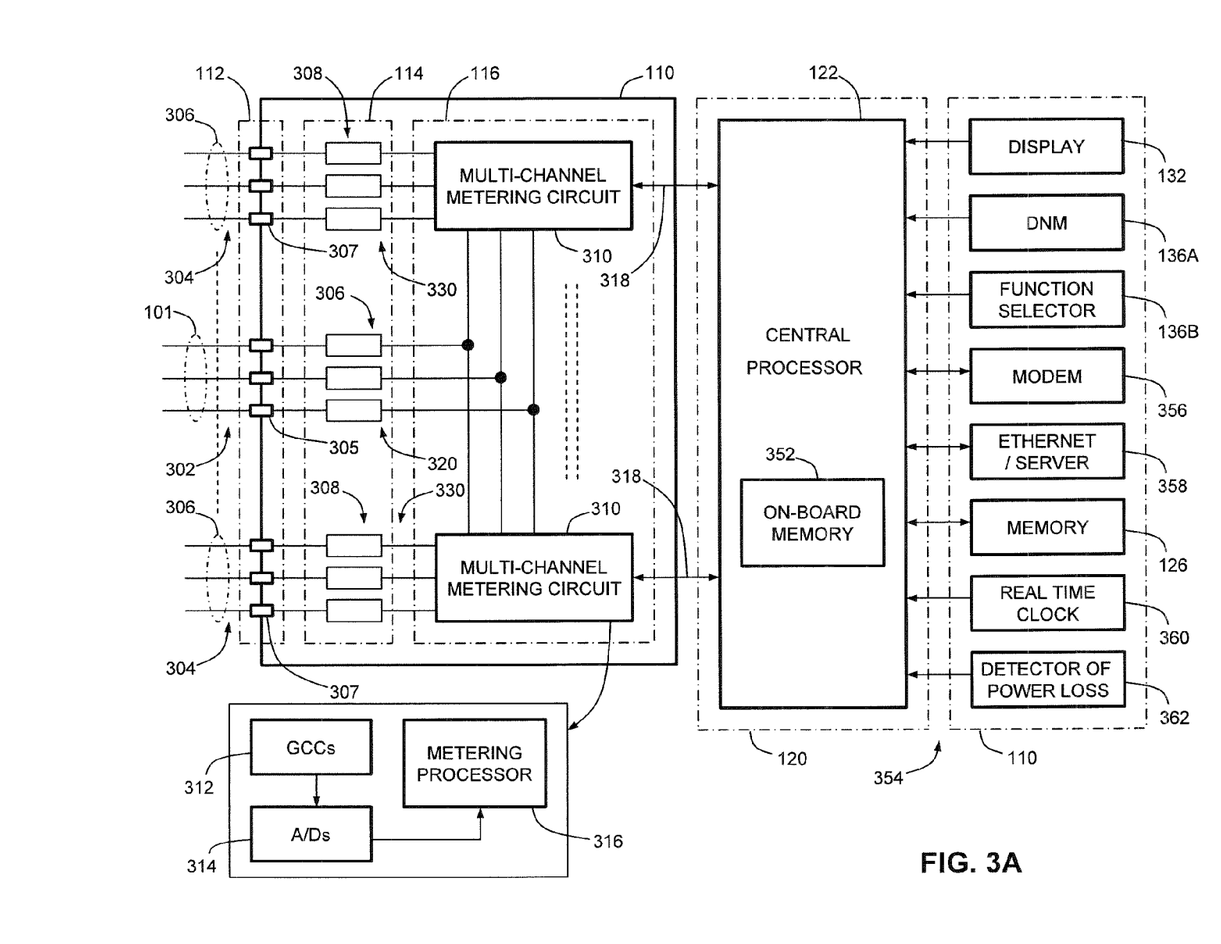
FIGS. 3A-3C are schematic diagrams illustrating embodiments of a metering module of the meter of FIG. 1.

Referring to FIG. 3A, in one exemplary embodiment, the metering module 110 comprises the input module 112 having a plurality of voltage inputs 302 coupled to phase lines of the electrical service 101 and several pluralities 306 of current inputs 304 from monitored loads (e.g., 2-8 monitored loads). In one embodiment, the metering module includes a minimum of ten (10) input channels. For a purpose of graphical clarity, neutral and grounding lines/inputs, if any, are omitted.

The voltage inputs 302 are selectively connected, via terminals 305, to voltage dividers 306. Correspondingly, the current inputs 304 are selectively connected, via terminals 307, to current sensors 308. A pair including a terminal 305 and voltage divider 306 forms a voltage input channel 320, and a pair including a terminal 307 and a current sensor 308 forms a current input channel 330, respectively.

Outputs of the input channels 320 and 330 (i.e., outputs of the voltage dividers 306 and current sensors 308) are coupled to inputs of multi-channel metering circuits 310. Illustratively, in the depicted embodiment, a metering circuit 310 includes a plurality of optional gain control circuits (GCCs) 312, a plurality of digital-to-analog converters (A/Ds) 314, and a multi-channel metering processor 316. In operation, the GCCs 312 selectively optimize gain factors of the output signals of the voltage dividers 306 and current sensors 308.

Gain-optimized output signals of the voltage dividers 306 and current sensors 308 are digitized by the A/D converters 314 and are forwarded for processing to the multi-channel metering processor 316 (e.g., six-channel metering processor). Each multi-channel metering processor 316 in real time simultaneously measures/calculates parameters of up to six inputted signals representing waveforms of voltages and currents of one of the loads being monitored by the meter 100 (for example, 3 voltage waveforms and 3 current waveforms per a load).

In some exemplary embodiments, a sampling rate of the ADCs 314 is in a range from about 12 to 36 KHz, which corresponds to about 200-600 data points per a cycle of the waveform of the being monitored voltages or currents at the AC frequency of 60 Hz. In one exemplary embodiment, when the sampling rate is about 26 KHz, the multi-channel metering processor 316 processes 400 data points per a cycle of each voltage and current waveform. The processors 316 transfer the results of the performed measurements to the processing module 120 via serial or parallel interfaces 318 (for example, Serial Peripheral Interface (SPI), and the like). It is envisioned by the present disclosure that the multi-channel metering circuit can be incorporated into the central processor (120) or that the multi-channel metering circuit merely digitizes the waveform using analog to digital conversion and as such transfers the samples to the central processor (120) to calculate all needed parameters and measurements. Moreover, the IED can use multi-channel or multiple analog to digital converters as well as single analog to digital converters with hardware to multiplex the said converters to receive differing signals or any combination thereof. In this embodiment, it is to be appreciated that since each load will be associated to a separate multi-channel metering circuit 310 and that each multi-channel metering circuit 310 has a relatively high sampling rate, the parameters of the individual loads coupled with the meter 100 can be measured or sensed simultaneously or near simultaneously so no data is lost. In this manner, the meter 100 will obtain highly accurate measurements for each load. The sensed or measured parameters can than be transferred to the central processor 122 at a later time.

Figure 3B:
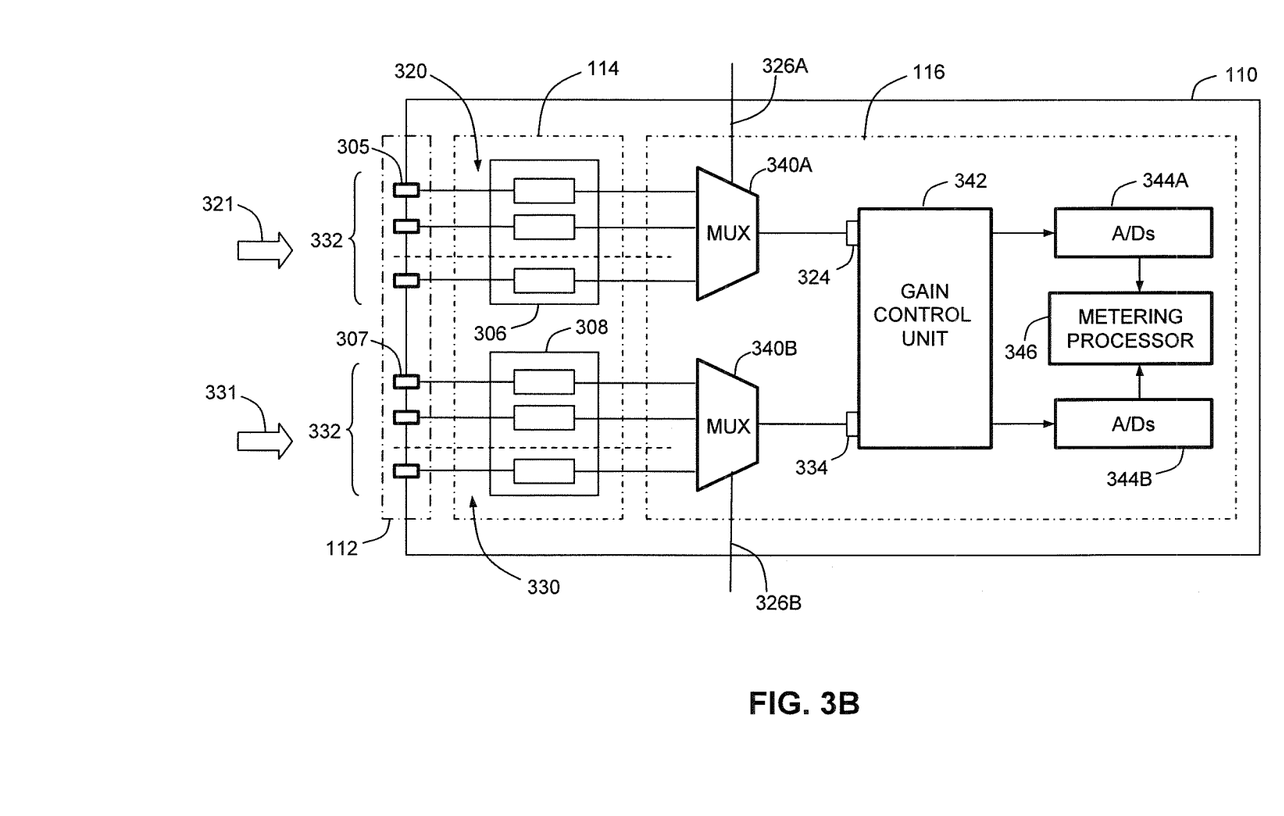

Referring to FIG. 3B, in another exemplary embodiment, the metering module 110 comprises user-configurable multiplexers 340A and 340B, which selectively aggregate outputs of a plurality 322 of the voltage input channels 320 (multiplexer 340A) and a plurality 332 of the current input channels 330 (multiplexer 340B) of the meter 100. Signals corresponding to the monitored phase voltages of the electrical service(s) 101 and currents of the loads monitored by the meter 100 are selectively coupled to the respective voltage and current input channels 320, 330. In particular, a plurality 321 of the voltages and a plurality 331 of the currents of such loads are selectively provided to the terminals 305 and 307 of the input channels 320 and 330, respectively. The multiplexers 340A and 340B are controlled using interfaces 326A and 326B, respectively.

In the depicted embodiment, the multiplexers 340A and 340B connect, in pre-determined orders, the input channels 320 and 330 to voltage and current input ports 324 and 334 of an optional dual-channel GCC 342, respectively. In operation, gain-optimized output signals of the voltage dividers 306 and current sensors 308 are digitized by A/D converters 344A, 344B and forwarded for processing to a dual-channel metering processor 346. Alternatively, outputs of the multiplexers 340A and 340B may directly be coupled to the A/D converters 344A and 344B, respectively.

Figure 3C:
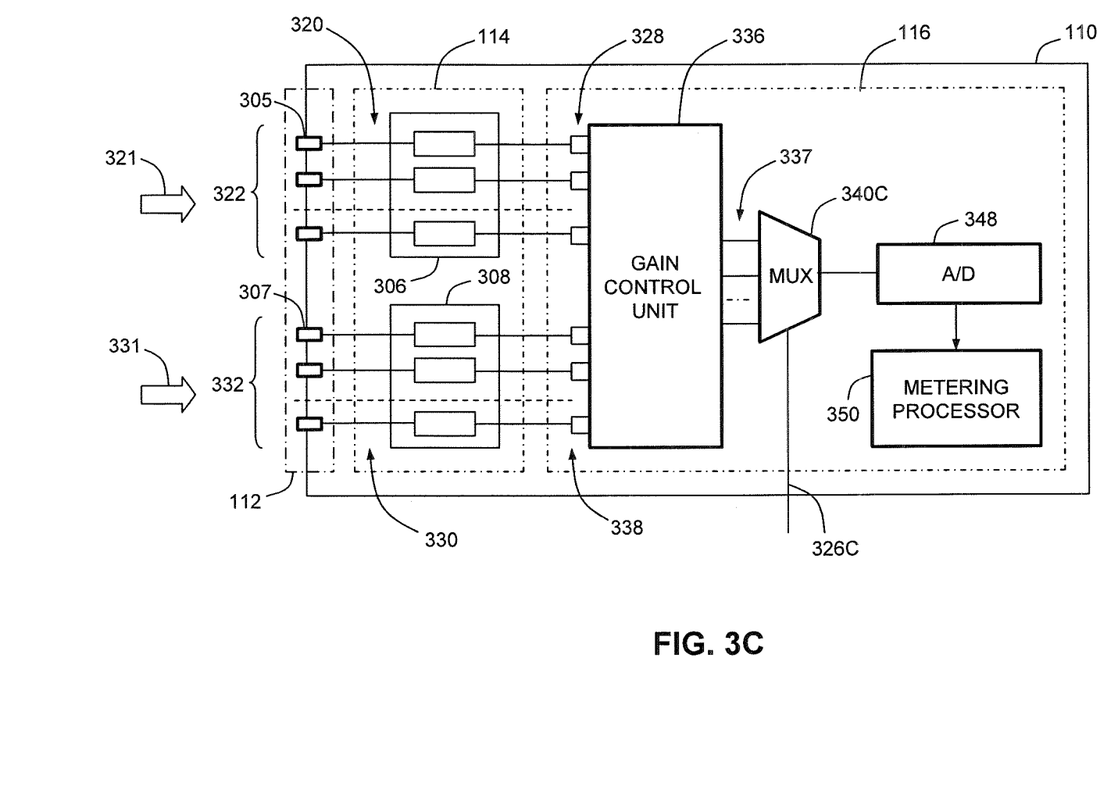

Referring to FIG. 3C, in yet another exemplary embodiment, the voltage input channels 320 and the current input channels 330 are selectively coupled, via an optional multi channel GCC 336, to inputs of a multiplexer 340C. In the depicted embodiment, the GCC 336 comprises a plurality of voltage ports 328 and a plurality of current ports 338, and gain-optimized output signals of the voltage dividers 306 and current sensors 308 are provided to the multiplexer 340C via a bus 337. In an alternate embodiment (not shown), the input channels 320, 330 may directly be coupled to inputs of the multiplexer 340C.

The multiplexer 340C is controlled by an interface 326C and, in operation, connects in a pre-determined order each of the input channels 320 and 330 to a single-channel A/D 348. From the A/D 348, digitized waveforms of the monitored voltages and currents are sequentially forwarded for processing to a single-channel metering processor 350.

In some configurations, switching diagrams of the multiplexers 340A-340C are controlled by the signals 326A-326C produced using components of the user interface unit 130 (discussed in detail below). For example, the switching diagrams of the multiplexers 340A-340C may be entered or modified by authorized personnel of the utility companies providing the services 101. Alternatively or additionally, the processing module 120 of the meter 100 determines the switching diagrams of the multiplexers 340A-340C using instructions received via the communications module 140. In alternate embodiments, each of the multiplexers 340A-340C may be a multi-stage arrangement of component multiplexing devices.

If some of the input channel 320 or 330 become accidentally damaged or inoperable, the inputs to such channels may be re-connected to vacant working input channels. Correspondingly, the multiplexers 340A, 340B may in-situ be re-configured to accommodate a new input wiring scheme including such input channels such that the inputs can be reorganized to associate inputs points to a common load even though the input terminals on the meter 100 are not physically next to each other. Therefore, the meter 100 is operable even when a portion of the input channels 320, 330 becomes defective. In some embodiments, the meter 100 comprises spare input channels to mitigate such occurrences.

In other embodiments, at least a portion of the input channels 320, 330 has a modular design or the input channels are detachably mounted in the meter 100. A base model of the meter 100 may comprise none or a pre-selected limited number of the input channels and be field-upgradeable to a desired number of the input channels as needed.

Some electric services 101 comprise remotely disposed sensors (not shown) of voltages and/or currents being provided to their loads. Such sensors may be connected to the meter 100 via wired or wireless interfaces. In particular, wired voltage/current sensors are connected to the input channels 320 and 330 of the input module 112, and the wireless voltage/current sensors may be coupled, as discussed below, to the meter 100 via the communications module 140.

Referring back to FIG. 1A, using bi-directional interface 123, the metering module 110 is coupled to the processing module 120 including a central processor 122, a digital signal processing (DSP) module 124, a memory 126, and support circuits 128. The memory 126 (e.g., RAM, ROM, EEPROM, flash memory, and the like) contains codes of programs and software modules facilitating functions of the meter 100. Such functions include various voltage, current, power, energy and power quality related measurements and calculations, support of user interface, and facilitation of network connectivity of the meter 100. In one exemplary embodiment, the memory 126 includes a code of a billing module 127 that allows the meter 100 to generate and/or adjust customized bills for energy consumed by each load monitored by the meter.

In one embodiment, the memory 126 contains code of a program that configures the meter 100 to operate as a terminal or a server of the network 170, such as an Intranet, a local area network (LAN), a wide area network (WAN), or the Internet (i.e., World Wide Web (WWW)). The meter 100 may transmit and receive information using standard communication protocols. For example, the meter may be configured to communicate using the Hypertext Transfer Protocol (HTML), the File Transfer Protocol (FTP), or the Extensive Markup Language (XML) Protocol, as well as perform, in real time, conversions between these protocols. Such techniques are described in commonly owned U.S. Pat. No. 6,751,563, the contents of which are incorporated by reference.

Both incoming and outgoing information may be in a form of email messages. Outgoing information generally comprises present or historic raw or systemized data, alarms, text/symbolic messages, charts, and bar graphs, whereas examples of incoming information include meter's configuration settings, request for meter's data or status information, and the like. In some embodiment, the meter 100 may produce information in a form of web pages allowing access to particular data or configuration settings of the meter. The email capability of the device shall have the capacity to generate utility type energy usage bills and attach those bills in the body or as an attachment to an outgoing email message. This allows different users to obtain energy and demand usage bills directly from the IED without need for separate software. This feature can also be extended thereof to include other outgoing messages such as meter sensor failures, meter tampering notices, voltage outages and/or desired data. Moreover, the email function could also be configured to receive messages from a computer system, software or a user including new firmware updates, control commands, resets or any other meter function that would normally either be configured by a user on the display screen of the IED or by communication protocol utilizing a PC computer to communicate with the IED. All permutations thereof concerning attaching commands to emails messages are contemplated herein within the present disclosure. Moreover, it is contemplated by the invention the email can be sent from one IED to another IED containing said information. It is further contemplated within the present disclosure that the communication module can be separate hardware or merely a software communication module within the central processor (120). Moreover, the communication module can also be configured as an external piece of hardware coupled to the IED through a connector.

Figure 1B:
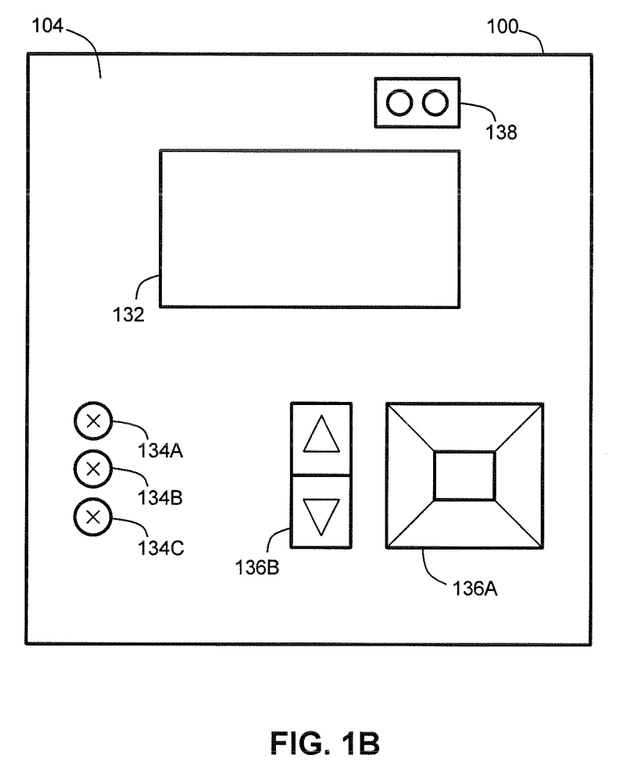

Referring to FIGS. 1A and 1B, the user interface unit 130 generally includes a front panel display 132 (e.g., liquid crystal display (LCD) or plasma display), indicators 134 (e.g., LED indicators), user controls 136 having a decision/navigation module (DNM) 136A and a function selector 136B, and an optional infra-red transmitter/receiver (IR T/R) 138 (all shown in FIG. 1B). The user controls 136 include pushbuttons allowing to select particular data of interest for being shown on the display 132, select/confirm configuration settings of the meter, or review status messages generated by the meter.

In one exemplary embodiment, the user interface unit 130 includes a touch-screen display 132, which may be used to review data and configuration settings of the meter 100 and to configure/re-configure the MUXs 340A-340C. For example, using the touch-screen display 132 particular input channels 320, 330 may be connected to or disconnected from the sensing circuit 114 of the meter 100. Alternatively or additionally, these operations may be performed using the user controls 136.

In another embodiment, the display 132 may be used to review, by authorized personnel, and generate or adjust bills for the energy consumed by each particular load monitored by the meter 100. For example, the touch-screen display 132 may be used to enter/modify billing rates, discounts, fees, etc. Additionally or alternatively, user controls 136 may also be used to perform configuration and billing operations (e.g., when the meter 100 comprises of a non-touch-screen display). Therefore, the meter 100 can operate as a self-contained metering/billing device, which does not require any additional software or hardware to perform such functions. The approved bills could be transferred by the meter 100 (e.g., e-mailed) to an owner of the facility where the meter is being installed and/or to the owners/tenants of the respective load(s). In one exemplary embodiment, customized bills for the consumed energy are generated and then consequently e-mailed by the meter 100 to the owner(s) and/or to tenants (for example, same-floor tenants) of a commercial/residential building which electrical services are monitored by the meter. Such bills and other portions of the outgoing information (e.g., notices, recommendations, etc.) may be generated by the meter 100 and forwarded to their addressees with predetermined periodicity.

In one exemplary embodiment, the communications module 140 comprises a network communication device 142, optional input/output (I/O) cards (i.e., printed circuit boards (PCBs)) $144_1$-$144_N$, an optional infra-red (IR) I/O card 146, and an optional wireless communication device 148. The meter 100 may be configured to include up to two of the same or different I/O cards 144. Exemplary I/O cards 144 include analog I/O cards and relay I/O cards. The device 142 and the I/O cards 144, 146 are generally coupled to the processing module 120 using serial interfaces, for example, DNP, Modbus, Serial Peripheral Interface (SPI), RS-232, or RS-485 interfaces.

The network communication device 142 is configured for providing bi-directional connectivity between the meter 100 and the network 170 (for example, via a hardware/software modem) and, structurally, includes one or more specialized cards or modules. In one embodiment, the network communication device 142 supports the TCP/IP and 10/100Base-T Ethernet communication protocols and, optionally, at least some of the Modbus/TCP, Modbus, Distributed Network Protocol (DNP) (e.g., DNP 3.0), RS-485, RS-232 and universal serial bus (USB) architectures.

The network communication device 142 may be a modem, network interface card (NIC), wireless transceiver, etc. The network communication device 142 will perform its functionality by hardwired and/or wireless connectivity. The hardwire connection may include but is not limited to hard wire cabling (e.g., parallel or serial cables, including RS-232, RS-485, USB, and Firewire (IEEE-1394) Ethernet, Fiber Optic, or Fiber Optic over Ethernet cables, and the appropriate communication port configuration. The wireless connection will operate under any of the wireless protocols, providing but not limited to Bluetooth™ connectivity, infrared connectivity, radio transmission connectivity including computer digital signal broadcasting and reception commonly referred to as Wi-Fi or 802.11.X (where X denotes the transmission protocol), satellite transmission or any other type of communication transmissions, as well as communication architecture or systems currently existing or to be developed for wirelessly transmitting data, including spread-spectrum systems operating at 900 MHz or other frequencies, Zigbee, WiFi, or mesh-enabled wireless communication systems. Note that it is contemplated within the present disclosure that the data may be transmitted using encryption algorithms such as 128 bit or 64 bit encryption.

Correspondingly, the I/O cards support industry-standard bi-directional 0-1 mA interface and 4-20 mA current loop interface, the relay I/O cards provide digital ON/OFF input/output contacts and an energy pulse output (i.e., KYZ pulse output), and the IR I/O card 146 supports bi-directional optical communications with external IR-enabled devices, such as Personal Digital Assistants (PDAs), laptops, and the like. Via respective communication links (not shown), the I/O cards 144 and 146 provide connectivity to remote users of the meter 100. In some embodiments, the wireless communication device 148 may be used for communications otherwise performed in the meter 100 using the network communication device 142 or I/O cards 144, 146.

The wireless communication device 148 is generally used to provide communication links between the meter 100 and remotely disposed voltage/current sensors of the loads being monitored by the meter. For example, such voltage/current sensors could be mounted at distribution apparatuses of the respective AC services or at the loads and wirelessly transmit data to the meter for processing by the metering module 110 thereof. In alternate embodiments, such voltage/current sensors may be network-compatible devices (e.g., devices compatible with the network 170), which are coupled to the nearest network port using a wired/wireless connection and communicate to the meter 100 via the network communication device 142 or I/O cards 144, 146.

Referring back to FIG. 3A, in one exemplary embodiment, the metering module 110 is coupled to the central processor 122 of the processing module 120 of the meter 100. The central processor 122 is provided with an optional on-board memory 352 (e.g., RAM, ROM, EEPROM, flash memory, and the like) and communicatively coupled via serial/parallel interfaces 354 to the touch-screen display 132, decision/navigation module 136A, function selector 136B, modem 356 and Ethernet/server circuit 358 of the communication module 140, memory 126, and real time clock 360 and detector 362 of power losses. In operation, the real time clock 360 is used to support energy calculations and billing features of the meter 100. Correspondingly, when a power loss occurs, the detector 362 produces a signal causing the meter 100 to store data in nonvolatile portions of the memories 126 and 352.

Referring back to FIG. 1B, an exemplary front panel 104 of the meter 100 comprises the display 132 (e.g., touch-screen display), LED indicators 134A-134C, user controls 136 including the decision/navigation module 136A, function selector 136B, and IR T/R 138. Together, the module 136A and selector 136B allow a user to program the meter 100 and review settings of the meter and data accumulated therein. In one particular embodiment, the LED indicators 134A-134C are "Power", "Alarm", and "Diagnostics" indicators of a mode of operation of the meter 100.

Figure 1C:
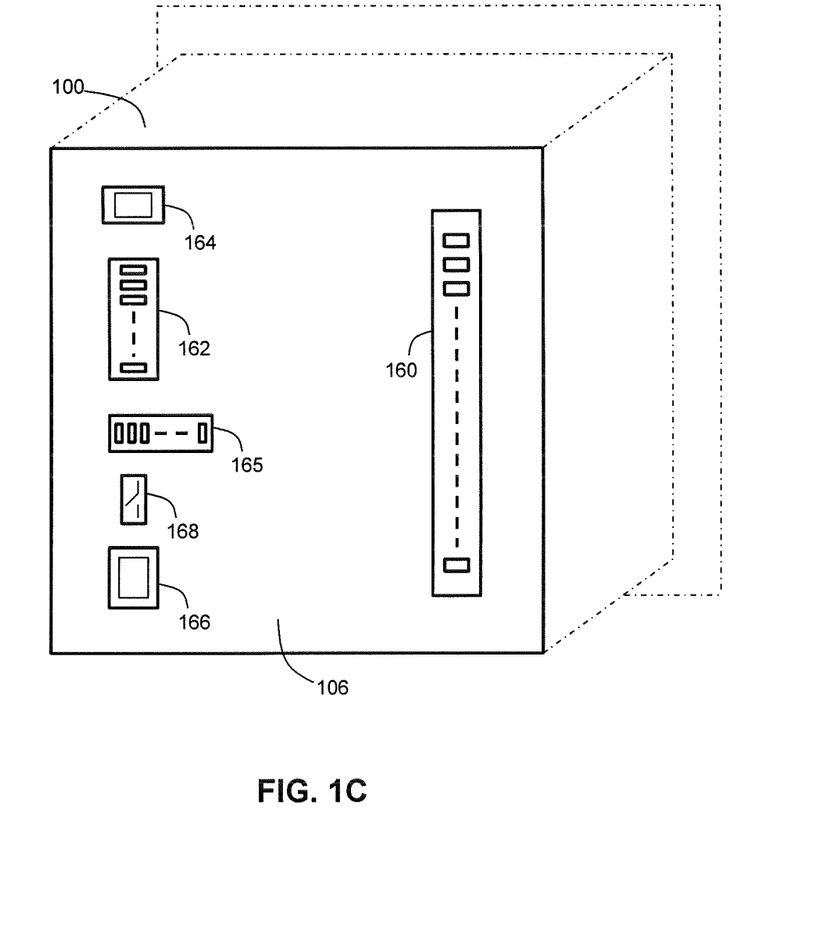

Referring back to FIG. 1C, an exemplary rear panel 106 of the meter 100 (shown in outline) comprises a connector 160 for inputs from current sensors of monitored loads (i.e., current inputs), a connector 162 for voltage inputs of the electrical services 101, connectors 164-166 for Ethernet/modem, RS-232, and RS-485 interfaces, respectively, and a selector switch 168. In operation, the switch 168 selectively enables the RS-232 connector 165 or the RS-485 connector 166.

Through infrastructure of the network 170, outgoing information may simultaneously be addressed and transferred to a plurality of network-enabled users, such as accounting, maintenance, or customer service personnel of a utility company operating the meter or power lines/loads monitored by the meter 100. Correspondingly, the meter 100, operating as a server or terminal of the network 170, may be assigned a plurality of network addresses (e.g., Internet addresses) and be simultaneously accessed by a plurality of network-enabled users. In one embodiment, the Dynamic Host Configuration Protocol (DHCP) may be used to assign Internet addresses to the meter 100 as described in the afore-mentioned U.S. Pat. No. 6,751,563. In some embodiments, the meter 100 may receive and transmit information using different communication protocols.

Figure 4:
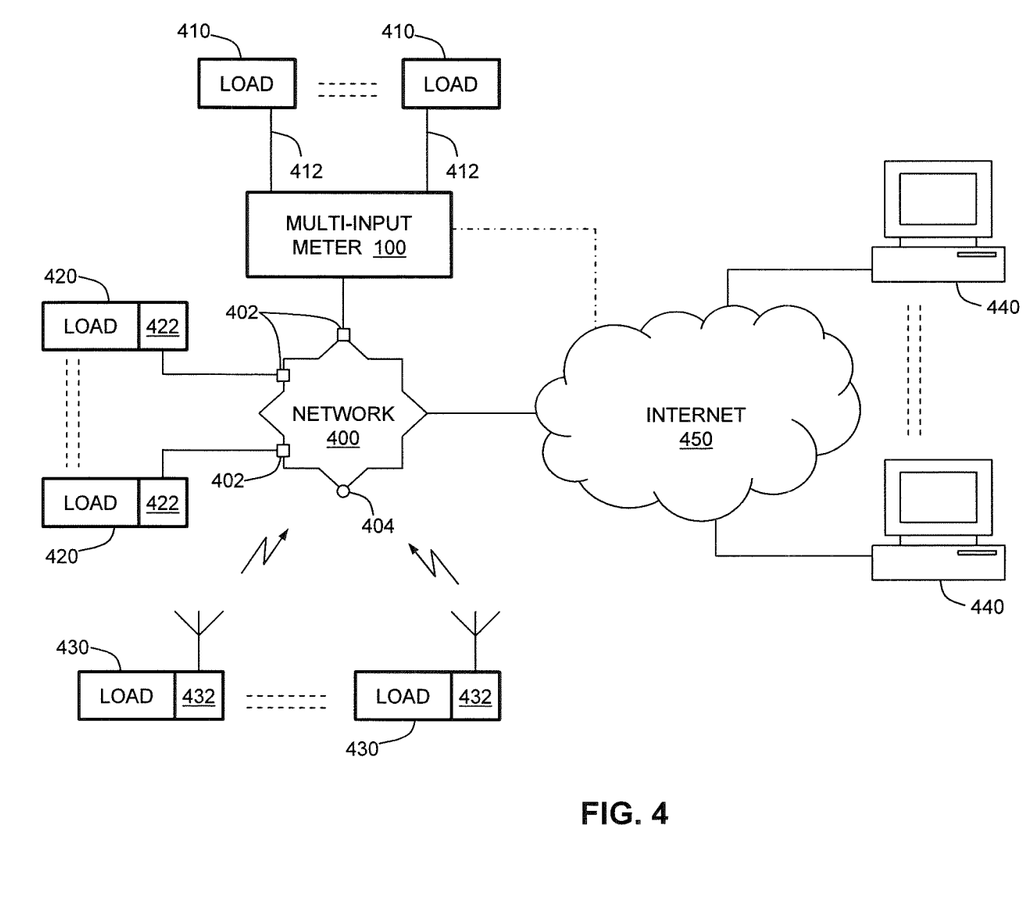
FIG. 4 is a schematic diagram illustrating connectivity and networking features of the meter of FIG. 1.

Referring to FIG. 4, in one exemplary embodiment, the meter 100 monitors loads 410 connected to the meter using wired voltage/current interfaces 412 and, via network 400 (e.g., LAN or WAN), monitors remote loads 420 and 430. The loads 420 include voltage/current sensors 422, which signals are communicated to respective wired access points 402 of the network 400. Correspondingly, the loads 430 are provided with sensors 432 having wireless communication capabilities for transmitting their information to a wireless access point 404 of the network 400. Illustratively, in the depicted embodiment, the meter 100 is coupled to a wired access points 402, however, in alternate embodiments, using a wireless adapter (not shown), the meter 100 may wirelessly be connected to one of the access points 404 of the network 400. In yet another embodiment, the meter 100 may communicatively be coupled (shown in phantom) to the Internet 450.

The network 400 is communicatively coupled to the Internet 450 accessible by users of the meter 100. In operation, via the network 400 and/or Internet 450, the meter 100 is accessible by the users 440, such as billing departments and service/line personnel of utility companies providing electric services to the monitored loads 410, 420 and 430, owners of the loads, and the like. Correspondingly, via the network 400 and the Internet 450, the meter 100 may transmit information (e.g., data, alarms, etc.) to the users thereof using communication protocols and formats discussed above in reference to the module 140 and, in particular, e-mail formats.

Figure 5:
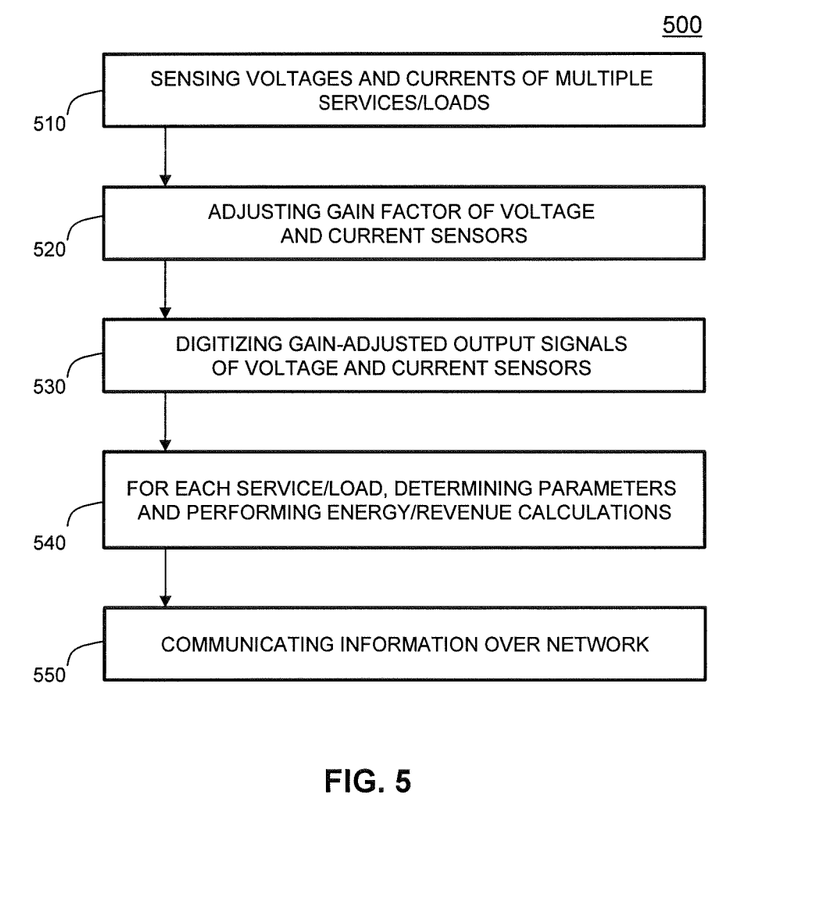
FIG. 5 is a high-level flow chart illustrating a method of operating the meter of FIG. 1.

FIG. 5 depicts a high-level flow diagram of a method 500 for operating the meter 100 of FIG. 1A in accordance with one embodiment of the present disclosure. The terms $V_S$ and $I_S$ are collectively used to designate voltages and currents of the phases A, B, and C of the electrical services 101 discussed above in reference to FIGS. 2A-2B and 3.

At step 510, the supply voltages $V_S$ and supply currents $I_S$ of the electrical services 101 are selectively sensed in the meter 100 using the respective voltage dividers and currents sensors of the sensing circuit 114 of the metering module 110. At step 520, gain factors of the voltage dividers and currents sensors are adjusted to pre-determined ranges using the gain control unit 116 and, at step 530, gain-adjusted output signals of the voltage dividers and currents sensors are digitized.

At step 540, the meter 100 determines properties of the voltages $V_S$ and currents $I_S$, analyzes waveforms thereof, and performs energy/revenue calculations. These operations are accomplished for each particular sub-set $101_i$ of the power lines connected to the meter 100 (i.e., for each load). Such power lines may belong to the same or different supply services 210. At step 550, the results of step 540 are selectively displayed on the front panel display 132 and, using elements of the communications module 140 (for example, network communication device 142), are transmitted, to the respective addressee(s) of the meter 100. Such transmissions are performed on demand or with pre-determined periodicity, whereas alarms and incoming messages may be communicated during execution of any step of the method 500.

Although the disclosure herein has been described with reference to particular illustrative embodiments, it is to be understood that these embodiments are merely illustrative of the principles and applications of the present disclosure. Therefore numerous modifications may be made to the illustrative embodiments and other arrangements may be devised without departing from the spirit and scope of the present disclosure, which is defined by the appended claims.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

What is claimed is:

1. An intelligent electronic device for measuring or calculating parameters of electrical services provided to a plurality of loads via a single supply service, the intelligent electronic device comprising:

a metering module including:

a set of voltage input channels configured to be coupled to a single supply service that supplies electrical services to a plurality of loads, multiple sets of current input channels, each set of current input channels configured to be coupled to a respective load of the plurality of loads, each current input channel of each set of current input channels comprising a current sensor located in the metering mdoule, and multiple metering circuits, each metering circuit corresponding to a respective load of the plurality of loads and configured for measuring or calculating parameters of the electrical services provided to the respective load, wherein outputs of the set of voltage input channels are coupled to each of the metering circuits and outputs of each set of current input channels are coupled to a respective metering circuit of the multiple metering circuits;

a processing module coupled to each of the metering circuits and configured for administering operation of the intelligent electronic device and processing data obtained from each of the metering circuits;

a user interface unit adapted for displaying data and configuring settings of the device; and a communication module configured for transmitting outgoing data to and receiving incoming data from terminals of a communication network.

2. The device of claim 1, wherein the metering module includes at least ten sets of current input channels.

3. The device of claim 1, wherein the parameters are selected from the group consisting of a line voltage, a line current, a phase voltage, a phase current, and a total harmonic distortion (THD) or a root mean square (RMS) value thereof; energy, real power, reactive power, total power, and power factor.

4. The device of claim 1, wherein the outgoing and incoming data is formatted in compliance with the Hypertext Transfer Protocol (HTML), Modbus TCP, the File Transfer Protocol (FTP), or the Extensive Markup Language (XML) Protocol.

5. The device of claim 1, wherein the metering module includes a multiplexer for multiplexing the set of voltage input channels and sets of current input channels to the metering circuits.

6. The device of claim 5, wherein said multiplexed set of voltage input channels and sets of current input channels are configurable using the user interface unit.

7. The device of claim 1, wherein the processing module further comprises a billing module adapted to generate customized bills for a plurality of customers corresponding to the plurality of loads.

8. The device of claim 7, wherein the customized bills may be emailed to the plurality of customers over the communication network.

9. The device of claim 1, wherein the communication module is further configured to communicate wirelessly to voltage and current sensors of said electrical services.

10. The device of claim 1, wherein said device is configured to operate as a server or a terminal of an Intranet, a local area network (LAN), a wide area network (WAN), or the Internet.

11. The device of claim 1, wherein said device is additionally compliant with at least one of RS232, Universal Serial Bus (USB) or RS-485 communication architectures.

12. The device of claim 1, wherein said device is configured for transmitting and receiving email messages.

13. The device of claim 1, wherein the outgoing data comprises at least one of raw or systemized data, alarms, text/symbolic messages, charts, and bar graphs.

14. The device of claim 1, wherein the incoming data comprises at least one of device's configuration settings or requests for device's data or status information.

15. The device of claim 1, wherein said device is configured for simultaneously communicating with a plurality of the terminals of the communication network.

16. The device of claim 1, wherein said device is one of a digital electrical power and energy meter, a Programmable Logic Controller (PLC), a Remote Terminal Unit, a protective relay, or a fault recorder.

17. A method of operating an intelligent electronic device, comprising:
providing an intelligent electronic device including a metering module, the metering module including:
a set of voltage input channels configured to be coupled to a single supply service that supplies electrical services to a plurality of loads,
multiple sets of current input channels, each set of current input channels configured to be coupled to a respective load of a plurality of loads, each current input channel of each set of current input channels comprising a current sensor located in the metering module, and
multiple metering circuits, each metering circuit corresponding to a respective load of the plurality of loads and configured for measuring or calculating parameters of a plurality of electrical services provided to the respective load,
wherein outputs of the set of voltage input channels are coupled to each of the metering circuit and outputs of each set of current input channels are coupled to a respective metering circuit of the multiple metering circuits;
measuring or calculating parameters of a plurality of single phase, dual phase, or three phase electrical services using the metering module; and
transmitting outgoing information to and receiving incoming information from terminals of a communication network via Ethernet TCP/IP protocol.

18. The method of claim 17, wherein the measuring step is performed on a minimum of 10 sets of current input channels simultaneously.

19. The method of claim 17, wherein any Ethernet communication utilizes encrypted communication.

20. The method of claim 17, wherein the parameters are selected from the group consisting of a line voltage, a line current, a phase voltage, a phase current, and a total harmonic distortion (THD) or a root mean square (RMS) value thereof; energy, real power, reactive power, total power, and power factor.

21. The method of claim 17, wherein the outgoing and incoming information is formatted in compliance with the Hypertext Transfer Protocol (HTML), Modbus TCP, the File Transfer Protocol (FTP), or the Extensive Markup Language (XML) Protocol.

22. The method of claim 17, further comprising multiplexing the set of voltage input channels and sets of current input channels from a plurality of sources for the measuring thereof.

23. The method of claim 22, wherein said multiplexed set of voltage input channels and sets of current input channels are configurable via a user interface unit to accommodate a new input wiring scheme.

24. The method of claim 17, further comprising generating customized bills for the plurality of customers corresponding to a plurality of electrical services.

25. The method of claim 24, further comprising emailing the customized bills to the plurality of customers.

26. The method of claim 17, wherein the outgoing and incoming information is exchanged by transmitting and receiving email messages.

27. The method of claim 17, wherein the intelligent electronic device is one of a digital electrical energy meter, a Programmable Logic Controller (PLC), a Remote Terminal Unit, a protective relay, or a fault recorder.

28. A digital electrical power and energy meter for measuring or calculating parameters of a plurality of electrical services provided to a plurality of loads via a single supply service, said plurality of electrical services including at least one of a single phase, dual phase, or three phase system, the meter comprising:
a metering module including:
a set of voltage input channels configured to be coupled to a single supply service that supplies electrical service to a plurality of loads,
multiple sets of current input channels, each set of current input channels configured to be coupled to a respective load of the plurality of loads, each current input channel of each set of current input channels comprising a current sensor located in the metering module, and
multiple metering circuits, each metering circuit corresponding to a respective load of the plurality of loads and configured for measuring or calculating parameters of the plurality of electrical services provided to the respective load,
wherein outputs of the set of voltage input channels are coupled to each of the metering circuits and outputs of each set of current input channels are coupled to a respective metering circuit of the multiple metering circuits;
a processing module coupled to each of the metering circuits and configured for administering operation of the meter;
a communication module configured for transmitting outgoing information to and receiving incoming information from terminals of a communication network;
a memory containing codes of programs providing operability of the meter; and
a central processor executing the codes to perform (i) measuring or calculating parameters of the plurality of electrical services connected to power supply lines of one alternating current (AC) service, and (ii) configuring the meter to operate as a server or a terminal of the communication network.

29. The meter of claim 28, wherein the plurality of electrical services includes electrical services to at least eight loads each coupled to the power supply lines of the AC service.

30. The meter of claim 29, wherein said parameters correspond to or are derived from up to three phase/line voltages and up to 24 phase/line currents of said loads.

31. The meter of claim 28, wherein the plurality of electrical services includes electrical services to at least eight loads connected to the power supply lines of two or more independent AC services.

32. The meter of claim 28, wherein the AC service is a 3-phase AC service.

33. The meter of claim 28, wherein the parameters are selected from the group consisting of a line voltage, a line current, a phase voltage, a phase current, and a total harmonic distortion (THD) or a root mean square (RMS) value thereof; energy, revenue, real power, reactive power, total power, and a power factor.

34. The meter of claim 28, wherein the metering circuits are multi-channel metering circuits, each multi-channel metering circuit including a metering processor for simultaneously measuring in real time parameters of up to 6 voltage and current waveforms.

35. The meter of claim 28, wherein the metering module comprises one of (i) a multiplexer for multiplexing signals corresponding to waveforms at voltage inputs and current inputs of said meter, and (ii) multiplexers for selective multiplexing the signals corresponding to waveforms at the voltage inputs or at the current inputs.

36. The meter of claim 35, wherein said multiplexed voltage and current inputs are configurable via a user interface unit.

37. The meter of claim 36, wherein said multiplexed voltage and current inputs are configurable using a touch-screen display of the user interface unit.

38. The meter of claim 28, wherein the memory comprises a code of a billing module adapted to generate customized bills for a plurality of customers corresponding to the plurality of electrical services.

39. The meter of claim 28, wherein the communication module is further configured to communicate wirelessly to voltage and current sensors of said electrical services.

40. The meter of claim 28, wherein said meter is configured to operate as the server or the terminal of an Intranet, a local area network (LAN), a wide area network (WAN), or the Internet.

41. The meter of claim 28, wherein said meter is configured to be compliant with at least one of the TCP/IP and 10/100Base-T Ethernet communication protocols.

42. The meter of claim 28, wherein said meter is configured to be compliant with at least one of the Modbus/TCP, Modbus, DNP 3.0, and RS-485 communication protocols.

43. The meter of claim 28, wherein said meter is configured for transmitting and receiving email messages.

44. The meter of claim 28, wherein the outgoing and incoming information is formatted in compliance with the Hypertext Transfer Protocol (HTML), the File Transfer Protocol (FTP), or the Extensive Markup Language (XML) Protocol.

45. The meter of claim 28, wherein the outgoing information comprises at least one of raw or systemized data, alarms, text/symbolic messages, charts, and bar graphs, and the incoming information comprises at least one configuration setting of the meter or requests for data or status information of the meter.

46. The meter of claim 28, wherein said meter is configured for simultaneously communicating with a plurality of the terminals of the communication network.

47. The device of claim 1, wherein the set of voltage input channels comprises a plurality of voltage dividers.

48. The device of claim 1 wherein the communication module is further configured to communicate wirelessly for transmitting the outgoing data to and receiving the incoming data from terminals of the communication network.

49. The device of claim 1 wherein the communication module is a wireless transceiver configured to operate in accordance with at least one wireless communication protocol.

50. The device of claim 1 further comprising at least one remote current sensor disposed remotely from the device and coupled to a respective load of the plurality of loads, the at least one remote current sensor being further coupled to a respective current input channel.

51. The method of claim 17, wherein the outgoing and incoming information is exchanged by wirelessly in accordance with at least one wireless communication protocol.

52. The method of claim 17, further comprising:
providing at least one remote current sensor disposed remotely from the device;
coupling the at least one remote current sensor to a respective load of the plurality of loads; and
coupling the at least one remote current sensor to a respective current input channel.

53. An intelligent electronic device for measuring or calculating parameters of electrical services provided to a plurality of loads via a single supply service, the intelligent electronic device comprising:
a metering module including:
a set of voltage input channels configured to be coupled to a single supply service that supplies electrical services to a plurality of loads,
multiple sets of current input channels, each set of current input channels configured to be coupled to a respective load of the plurality of loads, each current input channel of each set of current input channels comprising a current sensor located in the metering module, and
multiple metering circuits, each metering circuit corresponding to a respective load of the plurality of loads and configured for measuring or calculating parameters of the electrical services provided to the respective load,
wherein outputs of the set of voltage input channels are coupled to each of the metering circuits and outputs of each set of current input channels are coupled to a respective metering circuit of the multiple metering circuits;
a processing module coupled to each of the metering circuits and configured for administering operation of the intelligent electronic device and processing data obtained from each of the metering circuits; and
a communication module configured for transmitting outgoing data to and receiving incoming data from terminals of a communication network.

54. The device of claim 53, wherein the outgoing and incoming data is formatted in compliance with the Hypertext Transfer Protocol (HTML), Modbus TCP, the File Transfer Protocol (FTP), or the Extensive Markup Language (XML) Protocol.

55. The device of claim 53, wherein the processing module further comprises a billing module adapted to generate customized bills corresponding to the plurality of loads.

56. The device of claim 55, wherein the customized bills may be emailed to a user over the communication network.

57. The device of claim 53, wherein the communication module is further configured to communicate wirelessly to voltage and current sensors of said electrical services.

58. The device of claim 53, wherein said device is configured to operate as a server or a terminal of an Intranet, a local area network (LAN), a wide area network (WAN), or the Internet.

59. The device of claim 53, wherein said device is configured for transmitting and receiving email messages.

60. The device of claim 53, wherein said device is one of a digital electrical power and energy meter, a Programmable Logic Controller (PLC), a Remote Terminal Unit, a protective relay, or a fault recorder.

61. The device of claim 53, wherein the communication module is a wireless transceiver configured to operate in accordance with at least one wireless communication protocol.

62. The device of claim 53, further comprising at least one remote current sensor disposed remotely from the device and coupled to a respective load of the plurality of loads, the at least one remote current sensor being further coupled to a respective current input channel.

63. A system for measuring or calculating parameters of electrical services provided to a plurality of loads via a single supply service, the system comprising:
    an intelligent electronic device comprising:
        a metering module including:
            a set of voltage input channels configured to be coupled to a single supply service that supplies electrical services to a plurality of loads,
            multiple sets of current input channels, each current input channel of each set of current input channels comprising a current sensor located in the metering module, and
            multiple metering circuits, each metering circuit corresponding to a respective load of the plurality of loads and configured for measuring or calculating parameters of the electrical services provided to the respective load,
            wherein outputs of the set of voltage input channels are coupled to each of the metering circuits and outputs of each set of current input channels are coupled to a respective metering circuit of the multiple metering circuits;
        a processing module coupled to each of the metering circuits and configured for administering operation of the intelligent electronic device and processing data obtained from each of the metering circuits; and
        a communication module configured for transmitting outgoing data to and receiving incoming data from at least one device of a communication network; and
    at least one remote current sensor disposed remotely from the intelligent electronic device and coupled to a respective load of the plurality of loads, the at least one remote current sensor being further coupled to a respective current input channel.

64. The device of claim 53, further comprising a user interface unit adapted for displaying data and configuring settings of the device.

65. The device of claim 64, wherein the user interface unit includes a touch screen display.

66. The system of claim 63, wherein the intelligent electronic device further comprises a user interface unit adapted for displaying data and configuring settings of the device.

67. The system of claim 66, wherein the user interface unit includes a touch screen display.

68. The device of claim 64, wherein the user interface unit includes a liquid crystal display.

69. The device of claim 53, further comprising a user interface unit coupled to the processing module via a serial interface.

70. The device of claim 53, wherein the communication module is configured to be compliant with at least one of the TCP/IP and 10/100Base-T Ethernet communication protocols.

71. The device of claim 53, wherein communication module is configured to be compliant with at least one of the Modbus/TCP, Modbus, DNP 3.0, and RS-485 communication protocols.

72. The device of claim 53, wherein the communication module is a wireless transceiver configured to operate in accordance with at least one of Bluetooth connectivity, infrared connectivity, 802.11 connectivity and satellite transmission.

73. The device of claim 53, wherein the communication module is a wireless transceiver configured to operate in accordance with mesh connectivity.

74. The device of claim 53, wherein said device is configured to operate as a server that provides information in a form of web pages.

75. The device of claim 53, wherein the multiple metering circuits are configured to measure or calculate parameters for at least one of eight three-phase loads and twenty-four single-phase loads.

76. The device of claim 75, further comprising a user interface unit coupled to the processing module via a serial interface, wherein the communication module is configured to be compliant with at least one of the TCP/IP and 10/100Base-T Ethernet communication protocols.

* * * * *